US010869197B2

(12) United States Patent
Xu et al.

(10) Patent No.: US 10,869,197 B2
(45) Date of Patent: Dec. 15, 2020

(54) AUTHENTICATION METHOD, BASE STATION, USER EQUIPMENT, AND CORE NETWORK ELEMENT

(71) Applicant: Huawei Technologies Co., Ltd., Shenzhen (CN)

(72) Inventors: Bin Xu, Beijing (CN); Wei Quan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/415,819

(22) Filed: May 17, 2019

(65) Prior Publication Data

US 2019/0274041 A1 Sep. 5, 2019

Related U.S. Application Data

(63) Continuation of application No. PCT/CN2017/111703, filed on Nov. 17, 2017.

(30) Foreign Application Priority Data

Nov. 18, 2016 (CN) .......................... 2016 1 1034792

(51) Int. Cl.
*H04W 12/06* (2009.01)
*H04L 29/06* (2006.01)
*H04W 72/12* (2009.01)

(52) U.S. Cl.
CPC ......... *H04W 12/0609* (2019.01); *H04L 29/06* (2013.01); *H04L 63/0876* (2013.01); *H04L 63/104* (2013.01); *H04W 72/1268* (2013.01)

(58) Field of Classification Search
CPC ... H04W 12/06; H04W 12/08; H04W 12/001; H04W 12/002; H04W 12/005;
(Continued)

(56) References Cited

U.S. PATENT DOCUMENTS 8,813,195 B2* 8/2014 Wen ..................... H04L 63/0884
726/4
8,887,251 B2* 11/2014 Lei .................... H04W 12/0602
726/6
(Continued)

FOREIGN PATENT DOCUMENTS

CN 1771718 A 5/2006
CN 101588580 A 11/2009
(Continued)

OTHER PUBLICATIONS

"Update to solution 6.4.8," SA WG2 Meeting #116bis, Sanya, China, S2-165119, pp. 1-15, 3rd Generation Partnership Project, Valbonne, France (Aug. 29-Sep. 2, 2016).
(Continued)

*Primary Examiner* — Jean A Gelin
(74) *Attorney, Agent, or Firm* — Leydig, Voit & Mayer, Ltd.

(57) ABSTRACT

A base station, user equipment, and a core network element. The authentication method includes: receiving, by the base station, a first message sent by the user equipment, where the first message includes uplink data, a user equipment identifier, and a first authentication result; sending an authentication request message to the core network element; receiving an authentication response message sent by the core network element; and comparing the first authentication result and a second authentication result, and sending the uplink data to the core network element if the first authentication result is the same as the second authentication result. The base station performs security verification on the user equipment, to avoid arrival of data from unauthorized UE at the core network element, improve security, and save a transmission resource in comparison with the prior art.

17 Claims, 8 Drawing Sheets

(58) Field of Classification Search
CPC . H04W 12/02; H04W 76/10; H04W 72/1252; H04W 72/0413; H04W 72/12; H04W 12/0609; H04W 72/1268; H04L 63/0853; H04L 63/0869; H04L 63/0876; H04L 63/162; H04L 63/123; H04L 29/06
See application file for complete search history.

(56) References Cited

U.S. PATENT DOCUMENTS

| | | | | |
|---|---|---|---|---|
| 2002/0138761 | A1* | 9/2002 | Kanemaki | G06F 21/33 726/7 |
| 2006/0026671 | A1* | 2/2006 | Potter | H04L 69/24 726/7 |
| 2006/0079205 | A1* | 4/2006 | Semple | H04L 63/123 455/411 |
| 2006/0121895 | A1* | 6/2006 | Zou | H04L 63/0853 455/433 |
| 2011/0312301 | A1* | 12/2011 | Muller | H04L 9/083 455/411 |
| 2014/0334371 | A1* | 11/2014 | Kim | H04W 52/0206 370/311 |
| 2014/0335830 | A1* | 11/2014 | Wu | H04W 12/0609 455/411 |
| 2015/0043353 | A1* | 2/2015 | Javed | H04W 24/08 370/241 |
| 2016/0006726 | A1 | 1/2016 | Mizikovsky et al. | |
| 2016/0127894 | A1 | 5/2016 | Kahn et al. | |
| 2017/0201518 | A1* | 7/2017 | Holmqvist | G06F 21/40 |
| 2017/0223538 | A1 | 8/2017 | Hahn et al. | |
| 2018/0139792 | A1* | 5/2018 | Shinozaki | H04L 69/18 |
| 2018/0167866 | A1* | 6/2018 | Walter | H04L 63/126 |
| 2018/0332554 | A1* | 11/2018 | Kawasaki | H04W 60/00 |
| 2018/0332650 | A1* | 11/2018 | Kawasaki | H04W 88/16 |
| 2018/0359791 | A1* | 12/2018 | Kawasaki | H04W 4/70 |
| 2019/0037629 | A1* | 1/2019 | Ryu | H04W 8/08 |
| 2019/0239071 | A1* | 8/2019 | Krishnan | H04W 12/00502 |

FOREIGN PATENT DOCUMENTS

| | | |
|---|---|---|
| CN | 102149164 A | 8/2011 |
| CN | 102625306 A | 8/2012 |
| CN | 105391803 A | 3/2016 |
| WO | 2016021817 A1 | 2/2016 |

OTHER PUBLICATIONS

Nokia et al., "Discussion on Connectionless", 3GPP TSG-RAN WG2 Meeting #95, R2-164863, Gothenburg, Sweden, Aug. 22-26, 2016, 4 pages.

* cited by examiner

AUTHENTICATION METHOD, BASE STATION, USER EQUIPMENT, AND CORE NETWORK ELEMENT

CROSS-REFERENCE TO RELATED APPLICATIONS

This application is a continuation of International Application No. PCT/CN2017/111703, filed on Nov. 17, 2017, which claims priority to Chinese Patent Application No. 201611034792.X, filed on Nov. 18, 2016. The disclosures of the aforementioned applications are hereby incorporated by reference in their entireties.

TECHNICAL FIELD

The present invention relates to the communications field, and in particular, to an authentication method, a base station, user equipment, and a core network element.

BACKGROUND

When user equipment (UE) in an idle mode needs to transmit uplink data, the UE can perform subsequent uplink data transmission only after the UE first establishes a radio resource control (RRC) connection to a base station through random access and then enters an RRC connected mode to obtain an uplink grant. However, an RRC connection establishment process related to UE status switching causes a long latency. To meet a latency requirement of a service in a 5G communications network, in the prior art, connectionless transmission is used for applications in some scenarios. To be specific, when the UE in the idle mode needs to transmit the uplink data, the UE does not perform random access to switch to the connected mode, but directly sends the uplink data on a public resource in a contention-based (CB) manner based on configuration information in a broadcast message of the base station.

However, in wireless transmission in the prior art, when receiving uplink data, the base station only forwards a data packet of the uplink data based on a user equipment identifier carried in the data packet of the uplink data, and does not perform authentication on UE that transmits the data packet of the uplink data. In this case, unauthenticated UE sends data to a core network, causing a security problem. In addition, if the core network determines, after receiving the data, that the UE that sends the data is unauthorized, the core network needs to discard the received data. Consequently, a transmission resource is wasted.

SUMMARY

Embodiments of the present invention provides an authentication method, a base station, user equipment, and a core network element. The base station performs authentication on the UE, to improve data transmission security and save a transmission resource.

According to a first aspect, an embodiment of the present invention provides an authentication method, and the method includes:

receiving, by a base station, a first message sent by user equipment, where the first message includes uplink data, a user equipment identifier (for example, a user plane gateway connectionless transmission service identifier (UCLSI), an international mobile subscriber identity (IMSI), a temporary mobile subscriber identity (TMSI), or a globally unique temporary user equipment identity (GUTI)), and a first authentication result;

sending, by the base station, an authentication request message to a core network element, where the authentication request message includes the user equipment identifier, a group identifier of a group to which the user equipment belongs, or a cell identifier of a cell to which the user equipment belongs;

receiving, by the base station, an authentication response message sent by the core network element, where the authentication response message includes a second authentication result, and the second authentication result is an authentication result obtained by the core network element through calculation based on the authentication request message; and comparing, by the base station, the first authentication result and the second authentication result, and sending the uplink data to the core network element if the first authentication result is the same as the second authentication result.

The base station performs security verification on the user equipment, and performs authentication by using the group identifier of the UE, the cell identifier of the cell to which the UE belongs, or the user equipment identifier, to avoid arrival of data from unauthorized UE at the core network element, in other words, to avoid arrival of data from unauthorized UE at a core network. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

With reference to the first aspect, in a first possible implementation of the first aspect, the first authentication result is an authentication result obtained by the user equipment through calculation based on an authentication code and the cell identifier; or the first authentication result is an authentication result obtained by the user equipment through calculation based on an authentication code and the group identifier; or the first authentication result is an authentication result obtained by the user equipment through calculation based on an authentication code and the user equipment identifier; or the first authentication result is an authentication result obtained by the user equipment through calculation based on a user equipment key and the user equipment identifier. The base station may perform security verification on the UE by using the first authentication result obtained by the user equipment through calculation in different manners.

With reference to the first aspect or the first possible implementation of the first aspect, in a second possible implementation of the first aspect, the method further includes:

determining, by the base station based on network load, a service type, or a service data amount, whether to send the uplink data to the core network element. Based on security verification performed by the base station on the user equipment, connectionless transmission access control is added, to avoid impact, on a transmission service of the UE, that is caused by an increase in a probability of a conflict caused by an excessive quantity of UEs that perform connectionless transmission.

With reference to the second possible implementation of the first aspect, in a third possible implementation of the first aspect, the method further includes:

if the base station determines not to send the uplink data to a core network element, sending, by the base station to the user equipment, information indicating that a connectionless transmission request is rejected, to notify the user equipment that the connectionless transmission request is rejected.

According to a second aspect, an embodiment of the present invention provides an authentication method, and the method includes:

sending, by user equipment, a first request message to a core network element, where the first request message is used to request a connectionless transmission service; and in this embodiment of the present invention, the first request message may be an attach request message sent by the user equipment to the core network element, and the request message may include connectionless transmission request information;

receiving, by the user equipment, a response message sent by the core network element, where the response message includes a user equipment identifier allocated by a core network element to the user equipment, or the user equipment identifier and an authentication code allocated by a core network element to the user equipment;

determining, by the user equipment, a first authentication result based on the response message; and sending, by the user equipment, a first message to a base station, where the first message includes uplink data, the user equipment identifier, and the first authentication result. Therefore, the base station performs security verification on the user equipment based on the first authentication result, to improve security and avoid arrival of data from unauthorized UE at the core network element.

With reference to the second aspect, in a first possible implementation of the second aspect, the determining, by the user equipment, a first authentication result based on the response message includes:

determining, by the user equipment, the first authentication result based on the authentication code and a cell identifier of a cell to which the user equipment belongs; or determining, by the user equipment, the first authentication result based on the authentication code and a group identifier of a group to which the user equipment belongs; or determining, by the user equipment, the first authentication result based on the authentication code and the user equipment identifier.

Therefore, the base station implements group-level authentication or cell-level authentication on the user equipment, to avoid arrival of data from unauthorized UE at the core network element, improve security, and save a transmission resource.

With reference to the second aspect, in a second possible implementation of the second aspect, the determining, by the user equipment, a first authentication result based on the response message includes:

determining, by the user equipment, the first authentication result based on the user equipment identifier and a first key, where the first key is a key of the user equipment.

With reference to the second aspect to the second possible implementation of the second aspect, in a third possible implementation of the second aspect, the first request message includes at least one of a service data amount of the user equipment or a service type of the user equipment. Therefore, the core network element performs access control on a connectionless transmission request based on the service data amount of the user equipment or the service type of the user equipment, to reduce impact, on a service transmitted by latency-sensitive UE, that is caused by an increase in a probability of a conflict caused by an excessive quantity of UEs that perform connectionless transmission.

According to a third aspect, an embodiment of the present invention provides an authentication method, and the method includes:

receiving, by a core network element, an authentication request message sent by a base station, where the authentication request message includes a user equipment identifier allocated by a core network element to user equipment, a group identifier of a group to which user equipment belongs, or a cell identifier of a cell to which user equipment belongs;

determining, by the core network element, a first authentication result based on the authentication request message; and sending, by the core network element, the first authentication result to the base station.

According to the authentication method provided in this embodiment of the present invention, the base station implements group-level authentication or cell-level authentication on the user equipment, to avoid arrival of data from unauthorized UE at the core network element, improve security, and save a transmission resource.

With reference to the third aspect, in a first possible implementation of the third aspect, before the receiving, by a core network element, an authentication request message sent by a base station, the method further includes:

receiving, by the core network element, a first request message sent by the user equipment, where the first request message is used to request a connectionless transmission service;

determining, by the core network element, the user equipment identifier based on the first request message; and sending, by the core network element, a first response message to the user equipment, where the first response message includes the user equipment identifier.

The core network element establishes a connectionless transmission with the user equipment, and allocates the user equipment identifier to the user equipment that requests the connectionless transmission service, so that the user equipment obtains an authentication result through calculation based on the allocated user equipment identifier, and the authentication result is used by the base station to perform security verification on the user equipment.

With reference to the third aspect, in a second possible implementation of the third aspect, before the receiving, by a core network element, an authentication request message sent by a base station, the method further includes:

receiving, by the core network element, a first request message sent by the user equipment, where the first request message is used to request a connectionless transmission service;

determining, by the core network element, the user equipment identifier and an authentication code based on the first request message; and sending, by the core network element, a second response message to the user equipment, where the second response message includes the user equipment identifier and the authentication code.

Therefore, the user equipment obtains an authentication result through calculation based on the user equipment identifier and the authentication code that are allocated by the core network element to the user equipment, and the base station performs security verification on the user equipment based on the authentication result.

With reference to the first possible implementation of the third aspect, in a third possible implementation of the third aspect, the determining, by the core network element, a first authentication result based on the authentication request message includes:

determining, by the core network element, the first authentication result based on the user equipment identifier and a first key.

With reference to the second possible implementation of the third aspect, in a fourth possible implementation of the third aspect, the determining, by the core network element, a first authentication result based on the authentication request message includes:

determining, by the core network element, the first authentication result based on the authentication code, and the group identifier, the cell identifier, or the user equipment identifier.

With reference to any one of the third aspect, or the first to the fourth possible implementations of the third aspect, in a fifth possible implementation of the third aspect, the first request message includes at least one of a service data amount of the user equipment or a service type of the user equipment, and the method further includes:

determining, by the core network element based on the service data amount of the user equipment or the service type of the user equipment, whether to accept a connectionless transmission request of the user equipment. The core network element implements access control on the user equipment that requests the connectionless transmission service, and a network side may limit, based on a specific case, a quantity of UEs that perform connectionless transmission, to avoid impact, on a service transmitted by latency-sensitive UE, that is caused by an increase in a probability of a conflict caused by an excessive quantity of UEs that perform connectionless transmission.

With reference to the fifth possible implementation of the third aspect, in a sixth possible implementation of the third aspect, determining, by the core network element based on the first request message, to accept the connectionless transmission request of the user equipment includes:

if a quantity of connectionless transmission request messages received by the core network element does not meet a first preset threshold within a first preset time, determining, by the core network element, to accept the connectionless transmission request of the user equipment; or if the service data amount of the user equipment does not meet a second preset threshold, determining, by the core network element, to accept the connectionless transmission request of the user equipment; or if the service type of the user equipment is a preset service type, determining, by the core network element, to accept the connectionless transmission request of the user equipment.

With reference to the fifth possible implementation of the third aspect, in a seventh possible implementation of the third aspect, the user equipment identifier is used to instruct the core network element to accept the connectionless transmission request of the user equipment.

With reference to the fifth possible implementation of the third aspect, in an eighth possible implementation of the third aspect, the method further includes:

sending, by the core network element, a third response message to the user equipment, where the third response message includes information indicating that the connectionless transmission request of the user equipment is rejected, to notify the user equipment that the connectionless transmission service is rejected.

According to a fourth aspect, an embodiment of the present invention provides a base station, and the base station includes:

a receiving unit, configured to receive a first message sent by user equipment, where the first message includes uplink data, a user equipment identifier (for example, a user plane gateway connectionless transmission service identifier (UCLSI)), and a first authentication result;

a sending unit, configured to send an authentication request message to a core network element, where the authentication request message includes the user equipment identifier, a group identifier of a group to which the user equipment belongs, or a cell identifier of a cell to which the user equipment belongs, where the receiving unit is further configured to receive an authentication response message sent by the core network element, where the authentication response message includes a second authentication result, and the second authentication result is an authentication result obtained by the core network element through calculation based on the authentication request message; and a processing unit, configured to compare the first authentication result and the second authentication result, where the sending unit sends the uplink data to the core network element if the first authentication result is the same as the second authentication result.

The base station performs security verification on the user equipment, and performs authentication by using the group identifier of the UE, the cell identifier of the cell to which the UE belongs, or the user equipment identifier, to avoid arrival of data from unauthorized UE at the core network element, in other words, to avoid arrival of data from unauthorized UE at a core network. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

With reference to the fourth aspect, in a first possible implementation of the fourth aspect, the first authentication result is an authentication result obtained by the user equipment through calculation based on an authentication code and the cell identifier; or the first authentication result is an authentication result obtained by the user equipment through calculation based on an authentication code and the group identifier; or the first authentication result is an authentication result obtained by the user equipment through calculation based on an authentication code and the user equipment identifier; or the first authentication result is an authentication result obtained by the user equipment through calculation based on a user equipment key and the user equipment identifier.

With reference to the fourth aspect or the first possible implementation of the fourth aspect, in a second possible implementation of the fourth aspect, the processing unit is further configured to determine, based on network load, a service type, or a service data amount, whether to send the uplink data to the core network element. Based on security verification performed by the base station on the user equipment, connectionless transmission access control is added, to avoid impact, on a transmission service of the UE, that is caused by an increase in a probability of a conflict caused by an excessive quantity of UEs that perform connectionless transmission.

With reference to the second possible implementation of the fourth aspect, in a third possible implementation of the fourth aspect, if the processing unit determines not to send the uplink data to a core network element, the sending unit sends, to the user equipment, information indicating that a connectionless transmission request is rejected, to notify the user equipment that the connectionless transmission request is rejected.

According to a fifth aspect, an embodiment of the present invention provides user equipment, and the user equipment includes:

a sending unit, configured to send a first request message to a core network element, where the first request message is used to request a connectionless transmission service;

a receiving unit, configured to receive a response message sent by the core network element, where the response message includes a user equipment identifier allocated by a core network element to the user equipment, or the user equipment identifier and an authentication code allocated by a core network element to the user equipment; and a processing unit, configured to determine a first authentication result based on the response message, where the sending unit is further configured to send a first message to a base station, where the first message includes uplink data, the user equipment identifier, and the first authentication result.

Therefore, the base station performs security verification on the user equipment based on the first authentication result, to improve security and avoid arrival of data from unauthorized UE at the core network element.

With reference to the fifth aspect, in a first possible implementation of the fifth aspect, the processing unit is configured to:

determine the first authentication result based on the authentication code and a cell identifier of a cell to which the user equipment belongs; or determine the first authentication result based on the authentication code and a group identifier of a group to which the user equipment belongs; or determine the first authentication result based on the authentication code and the user equipment identifier.

Therefore, the base station implements group-level authentication or cell-level authentication on the user equipment, to avoid arrival of data from unauthorized UE at the core network element, improve security, and save a transmission resource.

With reference to the fifth aspect, in a second possible implementation of the fifth aspect, the processing unit is configured to:

determine the first authentication result based on the user equipment identifier and a first key, where the first key is a key of the user equipment.

With reference to the fifth aspect to the second possible implementation of the fifth aspect, in a third possible implementation of the fifth aspect, the first request message includes at least one of a service data amount of the user equipment or a service type of the user equipment. Therefore, the core network element performs access control on a connectionless transmission request based on the service data amount of the user equipment or the service type of the user equipment, to reduce impact, on a service transmitted by latency-sensitive UE, that is caused by an increase in a probability of a conflict caused by an excessive quantity of UEs that perform connectionless transmission.

According to a sixth aspect, an embodiment of the present invention provides a core network element, and the core network element includes:

a receiving unit, configured to receive an authentication request message sent by a base station, where the authentication request message includes a user equipment identifier allocated by a core network element to user equipment, a group identifier of a group to which user equipment belongs, or a cell identifier of a cell to which user equipment belongs;

a processing unit, configured to determine a first authentication result based on the authentication request message; and a sending unit, configured to send the first authentication result to the base station.

According to the core network element provided in this embodiment of the present invention, the base station implements group-level authentication or cell-level authentication on the user equipment, to avoid arrival of data from unauthorized UE at the core network element, improve security, and save a transmission resource.

With reference to the sixth aspect, in a first possible implementation of the sixth aspect, the receiving unit is further configured to receive a first request message sent by the user equipment, where the first request message is used to request a connectionless transmission service;

the processing unit is further configured to determine the user equipment identifier based on the first request message; and the sending unit is further configured to send a first response message to the user equipment, where the first response message includes the user equipment identifier.

The core network element establishes a connectionless transmission with the user equipment, and allocates the user equipment identifier to the user equipment that requests the connectionless transmission service, so that the user equipment obtains an authentication result through calculation based on the allocated user equipment identifier, and the authentication result is used by the base station to perform security verification on the user equipment.

With reference to the sixth aspect, in a second possible implementation of the sixth aspect, the receiving unit is further configured to receive a first request message sent by the user equipment, where the first request message is used to request a connectionless transmission service;

the processing unit is further configured to determine the user equipment identifier and an authentication code based on the first request message; and the sending unit is further configured to send a second response message to the user equipment, where the second response message includes the user equipment identifier and the authentication code.

Therefore, the user equipment obtains an authentication result through calculation based on the user equipment identifier and the authentication code that are allocated by the core network element to the user equipment, and the base station performs security verification on the user equipment based on the authentication result.

With reference to the first possible implementation of the sixth aspect, in a third possible implementation of the sixth aspect, the processing unit is configured to:

determine the first authentication result based on the user equipment identifier and a first key.

With reference to the second possible implementation of the sixth aspect, in a fourth possible implementation of the sixth aspect, that the processing unit determines the first authentication result based on the authentication request message includes:

determining, by the processing unit, the first authentication result based on the authentication code, and the group identifier, the cell identifier, or the user equipment identifier.

With reference to any one of the sixth aspect, or the first to the fourth possible implementations of the sixth aspect, in a fifth possible implementation of the sixth aspect, the first request message includes at least one of a service data amount of the user equipment or a service type of the user equipment; and the processing unit is further configured to determine, based on the service data amount of the user equipment or the service type of the user equipment, whether to accept a connectionless transmission request of the user equipment.

The core network element implements access control on the user equipment that requests the connectionless transmission service, and a network side may limit, based on a specific case, a quantity of UEs that perform connectionless transmission, to avoid impact, on a service transmitted by latency-sensitive UE, that is caused by an increase in a probability of a conflict caused by an excessive quantity of UEs that perform connectionless transmission.

With reference to the fifth possible implementation of the sixth aspect, in a sixth possible implementation of the sixth aspect, the processing unit is configured to:

if a quantity of connectionless transmission request messages received by the receiving unit does not meet a first preset threshold within a first preset time, determine to accept the connectionless transmission request of the user equipment; or if the service data amount of the user equipment does not meet a second preset threshold, determine to accept the connectionless transmission request of the user equipment; or if the service type of the user equipment is a preset service type, determine to accept the connectionless transmission request of the user equipment.

With reference to the fifth possible implementation of the sixth aspect, in a seventh possible implementation of the sixth aspect, the user equipment identifier is used to instruct the core network element to accept the connectionless transmission request of the user equipment.

With reference to the fifth possible implementation of the sixth aspect, in an eighth possible implementation of the sixth aspect, the sending unit is further configured to send a third response message to the user equipment, where the third response message includes information indicating that the connectionless transmission request of the user equipment is rejected.

According to a seventh aspect, an embodiment of the present invention provides a base station, and the base station includes a receiver, a transmitter, and a processor. Based on a same inventive concept, the base station provided in the seventh aspect has a function of executing the design solutions of the first aspect and the possible implementations of the first aspect, and may achieve corresponding technical effects of the first aspect. In addition, the base station provided in the fourth aspect may complete the design solutions of the first aspect and the possible implementations of the first aspect by using the base station provided in the seventh aspect. For brief description, details are not described herein again.

According to an eighth aspect, an embodiment of the present invention provides user equipment, and the user equipment includes a receiver, a transmitter, and a processor. Based on a same inventive concept, the user equipment provided in the eighth aspect has a function of executing the design solutions of the second aspect and the possible implementations of the second aspect, and may achieve corresponding technical effects of the second aspect. In addition, the user equipment provided in the fifth aspect may complete the design solutions of the second aspect and the possible implementations of the second aspect by using the user equipment provided in the eighth aspect. For brief description, details are not described herein again.

According to a ninth aspect, an embodiment of the present invention provides a core network element, and the core network element includes a receiver, a transmitter, and a processor. Based on a same inventive concept, the core network element provided in the ninth aspect has a function of executing the design solutions of the third aspect and the possible implementations of the third aspect, and may achieve corresponding technical effects of the third aspect. In addition, the core network element provided in the sixth aspect may complete the design solutions of the third aspect and the possible implementations of the third aspect by using the core network element provided in the ninth aspect. For brief description, details are not described herein again.

According to the authentication method, the base station, the user equipment, and the core network element provided in the present invention, the base station side performs security verification on the user equipment, to avoid arrival of data from unauthorized UE at the core network element, in other words, to avoid arrival of data from unauthorized UE at the core network element. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

DESCRIPTION OF EMBODIMENTS

Embodiments, of the present invention provides an authentication method, a base station, user equipment, and a core network element. When the UE and a core network element perform connectionless transmission, the UE obtains an authentication result through calculation based on a parameter (for example, an authentication code or a UCLSI), adds the authentication result to uplink data, and sends the uplink data to the base station. The base station compares the authentication result and an authentication result obtained by the core network element through calculation. If the two authentication results are the same, the base station forwards the uplink data to the core network element; or if the two authentication results are different, the base station discards the received uplink data.

The authentication method, the base station, the user equipment, and the core network element provided in embodiments of the present invention are mainly applied to various wireless communications systems such as Long Term Evolution (LTE), Universal Mobile Telecommunications System (UMTS), and a wireless communications structure similar to LTE or 5G A specific architecture is not limited.

Figure 1:
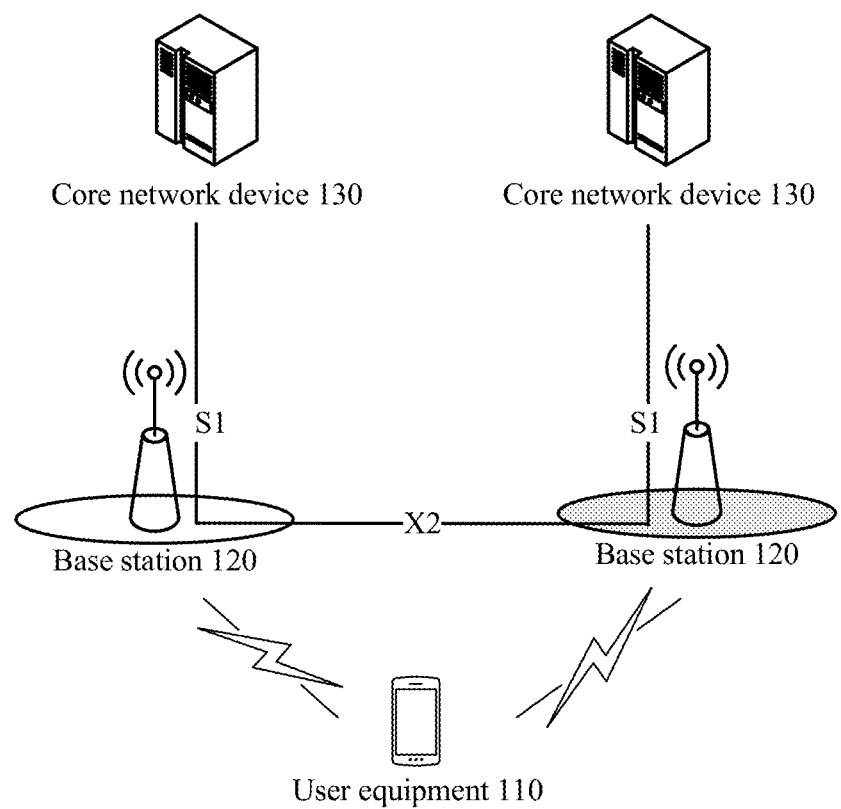
FIG. 1 is a schematic diagram of an LTE network architecture according to an embodiment of the present invention.

The following describes the embodiments of the present invention by using an LTE network architecture as an example. As shown in FIG. 1, the network architecture includes user equipment 110, a base station 120, and a core network device 130.

In the embodiments of the present invention, the user equipment (UE) 110 may be referred to as a terminal device, or may be referred to as a terminal, a mobile station (MS), a mobile terminal (mobile terminal), a notebook computer, or the like. The user equipment may communicate with one or more core network elements by using a radio access network (RAN). For example, the user equipment may be a mobile phone (or referred to as a "cellular" phone), a computer with a mobile terminal, or the like. For example, the user equipment may be a portable, pocket-sized, handheld, computer built-in, or in-vehicle mobile apparatus, and exchanges voice and/or data with the radio access network.

The base station 120 may also be referred to as an access network device, for example, a RAN device, and mainly communicates with the user equipment. The core network device 130 may be referred to as a core network element (CP), and is responsible for processing data sent by the user equipment and performing related signaling interaction.

In embodiments of the present invention, to meet a latency requirement of a service, when the UE needs to transmit uplink data, the UE transmits the data through connectionless transmission. To be specific, when UE in an idle mode needs to transmit uplink data, the UE does not perform random access to switch to a connected mode, but directly sends the data on a public resource in a contention-based manner based on a configuration in a broadcast message of the base station. In addition, to ensure data security, the technical solutions of embodiments of the present invention are provided.

The following describes the technical solutions in the embodiments of the present invention with reference to the accompanying drawings in the embodiments of the present invention.

Figure 2:
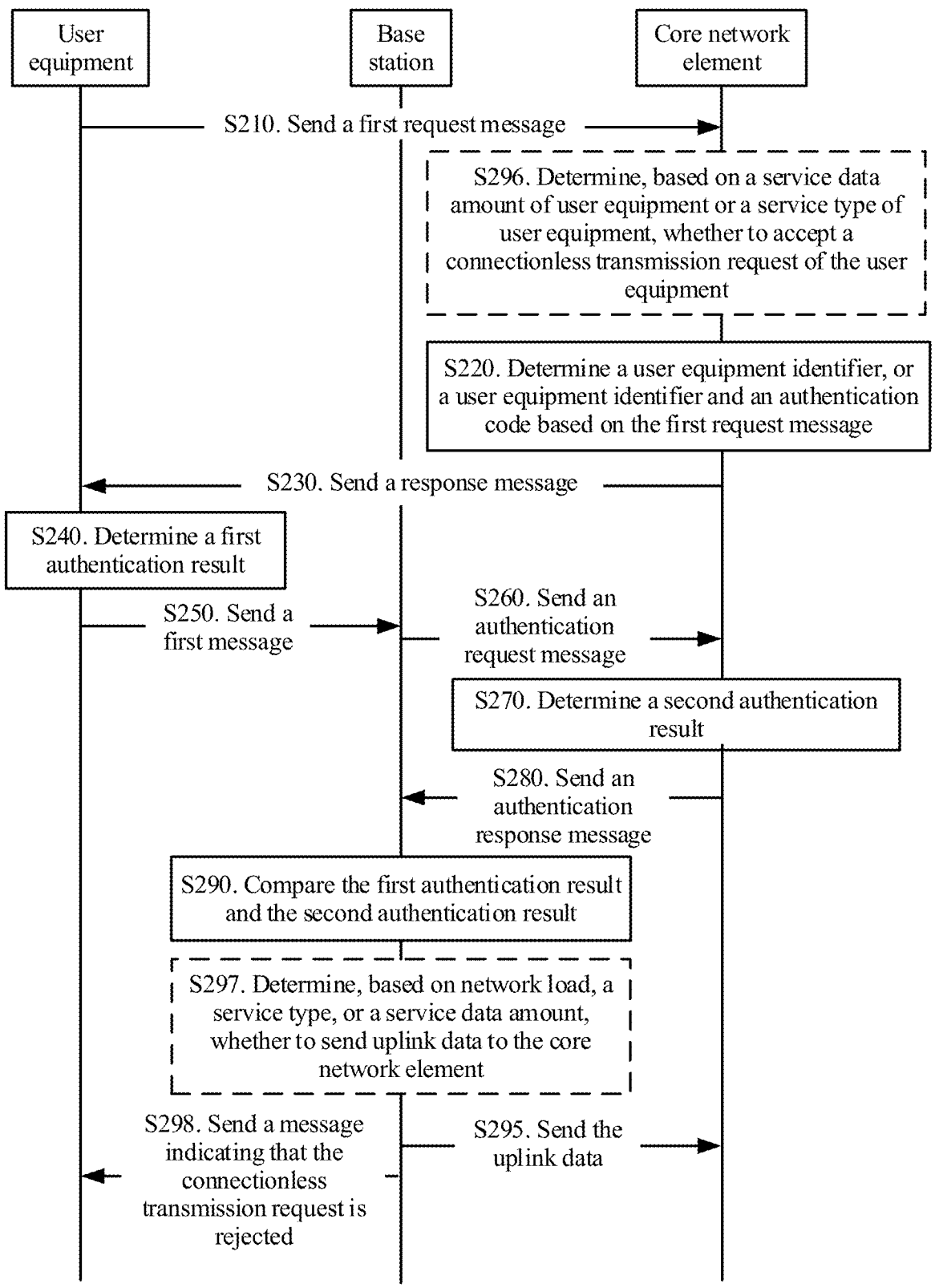
FIG. 2 is a flowchart of an authentication method according to an embodiment of the present invention.

FIG. 2 is a flowchart of an authentication method according to an embodiment of the present invention. As shown in FIG. 2, the method may include the following steps.

S210. User equipment sends a first request message to a core network element.

After the user equipment UE is powered on, the UE first needs to perform an attach process. The UE sends an attach request message to the core network element, and the attach request message may be referred to as the first request message. If the UE needs to perform connectionless transmission, the UE needs to add a connectionless transmission request to the attach request message. That is, the first request message is used to request a connectionless transmission service. In other words, the UE sends a connectionless transmission request message to the core network element.

S220. The core network element determines a user equipment identifier, or a user equipment identifier and an authentication code based on the first request message.

Optionally, after receiving the first request message, the core network element allocates the user equipment identifier to the user equipment that requests the connectionless transmission service. In this embodiment of the present invention, the user equipment identifier may be a user plane gateway connectionless transmission service identifier (UCLSI), an international mobile subscriber identity (IMSI), a temporary mobile subscriber identity (TMSI), or a globally unique temporary user equipment identity (GUTI). This is not limited in this embodiment of the present invention. When the UE performs connectionless transmission, the user equipment identifier is used to instruct a base station to forward, to a corresponding packet data unit (PDU) session, uplink data sent by the UE, so that the core network element performs subsequent processing.

Optionally, in this embodiment of the present invention, the core network element may further allocate one authentication code to the user equipment that requests connectionless transmission, so that the UE performs security verification based on the authentication code.

In this embodiment of the present invention, it may be specified that one authentication code is allocated to one UE, or it may be specified that one authentication code is allocated to one group. When the UE performs attachment, the core network element randomly selects one authentication code from a plurality of authentication codes, and allocates the authentication code to the UE.

S230. The core network element sends a response message to the user equipment.

Optionally, the core network element sends an attach accept response message to the user equipment. The attach accept response message may be referred to as a first response message, and the first response message may include the user equipment identifier.

Optionally, the core network element sends an attach accept response message to the user equipment. The attach accept response message may be referred to as a second response message, and the second response message may include the user equipment identifier and the authentication code.

S240. The user equipment determines a first authentication result based on the response message.

Optionally, the first authentication result is an authentication result obtained by the user equipment through calculation based on a user equipment key and the user equipment identifier. Optionally, the first authentication result may be an authentication result determined by the user equipment based on the authentication code, and a cell identifier of a cell to which the user equipment belongs, a group identifier of a group to which the user equipment belongs, or the user equipment identifier.

S250. The user equipment sends a first message to a base station, where the first message includes uplink data, the user equipment identifier, and the first authentication result.

The user equipment receives the response message sent by the core network element, to notify the user equipment that the core network element accepts attachment. When the user equipment may perform connectionless transmission, the user equipment sends the uplink data to the base station, and adds an authentication result obtained through calculation based on the authentication code to the uplink data.

S260. The base station sends an authentication request message to the core network element.

The authentication request message may include the user equipment identifier, the group identifier of the group to which the user equipment that requests to establish connectionless transmission belongs, or the cell identifier of the cell to which the user equipment that requests to establish connectionless transmission belongs, so that the core network element obtains an authentication result through calculation based on the authentication request message, and performs security verification.

S270. The core network element determines a second authentication result based on the authentication request message.

The second authentication result is an authentication result obtained by the core network element through calculation based on the group identifier of the group to which the user equipment that requests to establish connectionless transmission belongs and the authentication code allocated by a core network element to the user equipment; or an authentication result obtained by the core network element through calculation based on the cell identifier of the cell to which the user equipment that requests to establish connectionless transmission belongs and the authentication code allocated by a core network element to the user equipment; or an authentication result obtained by the core network element through calculation based on the identifier of the user equipment that requests to establish connectionless transmission and the authentication code allocated by a core network element to the user equipment.

In this embodiment of the present invention, one cell may be corresponding to one or more authentication codes. If one cell is corresponding to a plurality of authentication codes, the core network element needs to separately perform calculation on the cell identifier and the corresponding plurality of authentication codes by using an authentication algorithm, to obtain a plurality of authentication results, and send the plurality of authentication results to the base station.

S280. The core network element sends an authentication response message to the base station.

The authentication response message may include the user equipment identifier and the authentication result obtained by the core network element through calculation.

S290. The base station compares the first authentication result and the second authentication result.

The base station compares the first authentication result obtained from the user equipment and the second authentication result obtained from the core network element. If the base station receives the plurality of authentication results sent by the core network element, the base station needs to compare each authentication result and the first authentication result. If the authentication result obtained from the user equipment is the same as one of at least one authentication result obtained from the core network element, authentication succeeds and S295 is performed; or if the authentication result obtained from the user equipment is different from all of at least one authentication result obtained from the core network element, the base station discards the data from the user equipment. In this way, data security is improved. In addition, in comparison with the prior art in which when a core network element verifies that user equipment is unauthorized user equipment, the core network element discards received data transmitted by the user equipment, a transmission resource is saved.

S295. The base station sends the uplink data to the core network element based on the user equipment identifier.

When the first authentication result is the same as the second authentication result, the base station sends, based on the user equipment identifier, the uplink data corresponding to the first authentication result to the corresponding PDU session, that is, to the core network element, for subsequent processing.

Optionally, after the base station compares the first authentication result and the second authentication result, the method may further include the following: The base station sends feedback information to the user equipment, to notify the user equipment of a connectionless transmission success or failure. For example, if the first authentication result is the same as the second authentication result, the base station sends connectionless transmission success information to the user equipment; or if the first authentication result is different from the second authentication result, the base station sends connectionless transmission failure information to the user equipment.

According to the authentication method provided in this embodiment of the present invention, the base station performs security verification on the user equipment, and performs authentication by using the group identifier of the UE, the cell identifier of the cell to which the UE belongs, or the user equipment identifier, to avoid arrival of data from unauthorized UE at the core network element, in other words, to avoid arrival of data from unauthorized UE at the core network. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

It should be noted that in this embodiment of the present invention, S260 and S270 may be performed before S240 and S250. This is not limited in this embodiment of the present invention.

Optionally, in this embodiment of the present invention, the first request message includes at least one of a service data amount of the user equipment or a service type of the user equipment. As shown in FIG. 2, the method further includes the following step:

S296. The core network element determines, based on a service data amount of the user equipment or a service type of the user equipment, whether to accept a connectionless transmission request of the user equipment. In this way, the core network element implements connectionless transmission access control, and a network side may limit, based on a specific case, a quantity of UEs that perform connectionless transmission, to avoid impact, on a service transmitted by latency-sensitive UE, that is caused by an increase in a probability of a conflict caused by an excessive quantity of UEs that perform connectionless transmission. For specific description, refer to description in FIG. 6.

Optionally, in this embodiment of the present invention, as shown in FIG. 2, after the base station receives the first message sent by the user equipment, the method may further include the following step:

S297. The base station determines, based on network load, a service type, or a service data amount, whether to send the uplink data to the core network element. Therefore, the base station controls connectionless access, to avoid impact, on a service transmitted by latency-sensitive UE, that is caused by an increase in a probability of a conflict caused by an excessive quantity of UEs that perform connectionless transmission.

Optionally, the method may further include the following step:

S298. If the base station determines not to send the uplink data to a core network element, the base station sends, to the user equipment, information indicating that a connectionless transmission request is rejected, to notify the user equipment that connectionless transmission is rejected.

The following describes the technical solutions of the present invention by using an example in which a user equipment identifier is a UCLSI.

Figure 3:
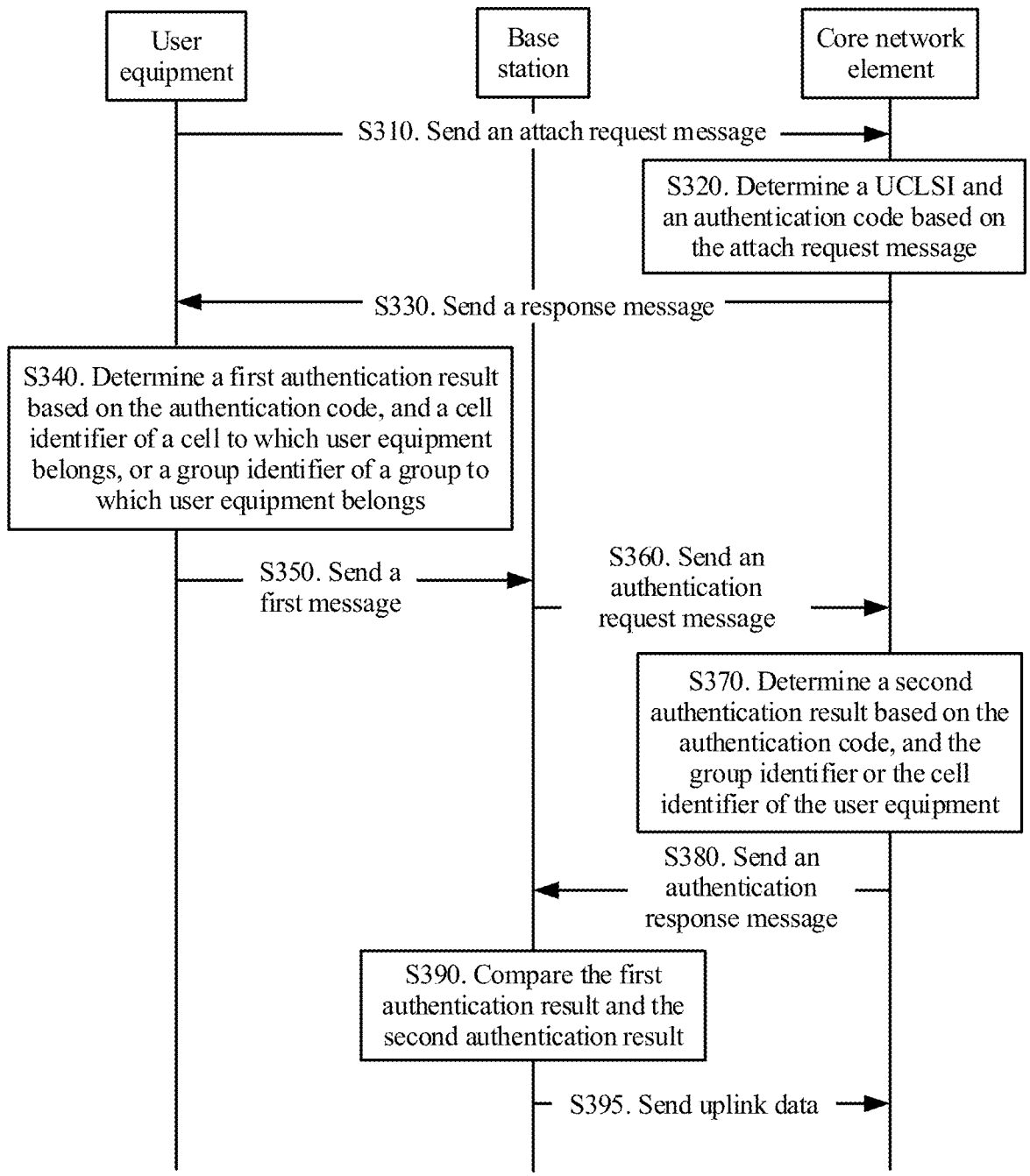
FIG. 3 is a flowchart of an authentication method according to an embodiment of the present invention.

FIG. 3 is a flowchart of an authentication method according to an embodiment of the present invention. As shown in FIG. 3, the method may include the following steps.

S310. User equipment sends an attach request message to a core network element, where the attach request message includes connectionless transmission request information.

A specific process of S310 is the same as the process of S210 in FIG. 2. For brief description, details are not described herein again.

S320. The core network element determines a user plane gateway connectionless transmission service identifier UCLSI and an authentication code based on the attach request message.

When the UE performs connectionless transmission, the UCLSI is used to instruct a base station to forward, to a corresponding packet data unit (PDU) session, uplink data sent by the UE, so that the core network element performs subsequent processing.

The core network element allocates one authentication code to the user equipment that requests connectionless transmission, so that the UE performs security verification based on the authentication code.

In this embodiment of the present invention, it may be specified that one authentication code is allocated to one UE, or it may be specified that one authentication code is allocated to one group. When the UE performs attachment, the core network element randomly selects one authentication code from a plurality of authentication codes and allocates the authentication code to the UE.

S330. The core network element sends a response message to the user equipment, where the response message may include the UCLSI and the authentication code.

S340. The user equipment determines a first authentication result based on the authentication code, and a cell identifier of a cell to which the user equipment belongs, a group identifier of a group to which the user equipment belongs, or a user equipment identifier.

S350. The user equipment sends a first message to a base station, where the first message includes uplink data, the UCLSI, and the first authentication result.

The user equipment receives the response message sent by the core network element, to notify the user equipment that the core network element accepts attachment. When the user equipment may perform connectionless transmission, the user equipment sends the uplink data to the base station, and adds the authentication result obtained through calculation based on the authentication code to the uplink data.

S360. The base station sends an authentication request message to the core network element.

The authentication request message may include the UCLSI, the group identifier of the group to which the user equipment that requests to establish connectionless transmission belongs, or the cell identifier of the cell to which the user equipment that requests to establish connectionless transmission belongs, so that the core network element obtains an authentication result through calculation based on the authentication request message, and performs security verification.

S370. The core network element determines a second authentication result based on the authentication request message.

The second authentication result is an authentication result obtained by the core network element through calculation based on the group identifier of the group to which the user equipment that requests to establish connectionless transmission belongs and the authentication code allocated by a core network element to the user equipment; or an authentication result obtained by the core network element through calculation based on the cell identifier of the cell to which the user equipment that requests to establish connectionless transmission belongs and the authentication code allocated by a core network element to the user equipment; or an authentication result obtained by the core network element through calculation based on the identifier of the user equipment that requests to establish connectionless transmission and the authentication code allocated by a core network element to the user equipment.

In this embodiment of the present invention, one cell may be corresponding to one or more authentication codes. If one cell is corresponding to a plurality of authentication codes, the core network element needs to separately perform calculation on the cell identifier and the corresponding plurality of authentication codes by using an authentication algorithm, to obtain a plurality of authentication results, and send the plurality of authentication results to the base station.

S380. The core network element sends an authentication response message to the base station.

The authentication response message may include the UCLSI and the authentication result obtained by the core network element through calculation.

S390. The base station compares the first authentication result and the second authentication result.

The base station compares the first authentication result obtained from the user equipment and the second authentication result obtained from the core network element. If the base station receives the plurality of authentication results sent by the core network element, the base station needs to compare each authentication result and the first authentication result. If the authentication result obtained from the user equipment is the same as one of at least one authentication result obtained from the core network element, authentication succeeds and S395 is performed; or if the authentication result obtained from the user equipment is different from all of at least one authentication result obtained from the core network element, the base station discards the data from the user equipment. In this way, data security is improved. In addition, in comparison with the prior art in which when a core network element verifies that user equipment is unauthorized user equipment, the core network element discards received data transmitted by the user equipment, a transmission resource is saved.

S395. The base station sends the uplink data to the core network element based on the UCLSI.

When the first authentication result is the same as the second authentication result, the base station sends, based on the UCLSI, the uplink data corresponding to the first authentication result to the corresponding PDU session, in other words, sends the uplink data to the core network element for subsequent processing.

Optionally, after the base station compares the first authentication result and the second authentication result, the method may further include the following: The base station sends feedback information to the user equipment, to notify the user equipment of a connectionless transmission success or failure. For example, if the first authentication result is the same as the second authentication result, the base station sends connectionless transmission success information to the user equipment; or if the first authentication result is different from the second authentication result, the base station sends connectionless transmission failure information to the user equipment.

Optionally, if the base station determines not to send the uplink data to the core network element, the base station sends, to the user equipment, information indicating that a connectionless transmission request is rejected.

According to the authentication method provided in this embodiment of the present invention, the base station performs security verification on the user equipment, and performs authentication by using the group identifier of the UE, the cell identifier of the cell to which the UE belongs, or the user equipment identifier, to avoid arrival of data from unauthorized UE at the core network element, in other words, to avoid arrival of data from unauthorized UE at the core network. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

It should be noted that in this embodiment of the present invention, S360 and S370 may be performed before S340 and S350. This is not limited in this embodiment of the present invention.

Figure 4:
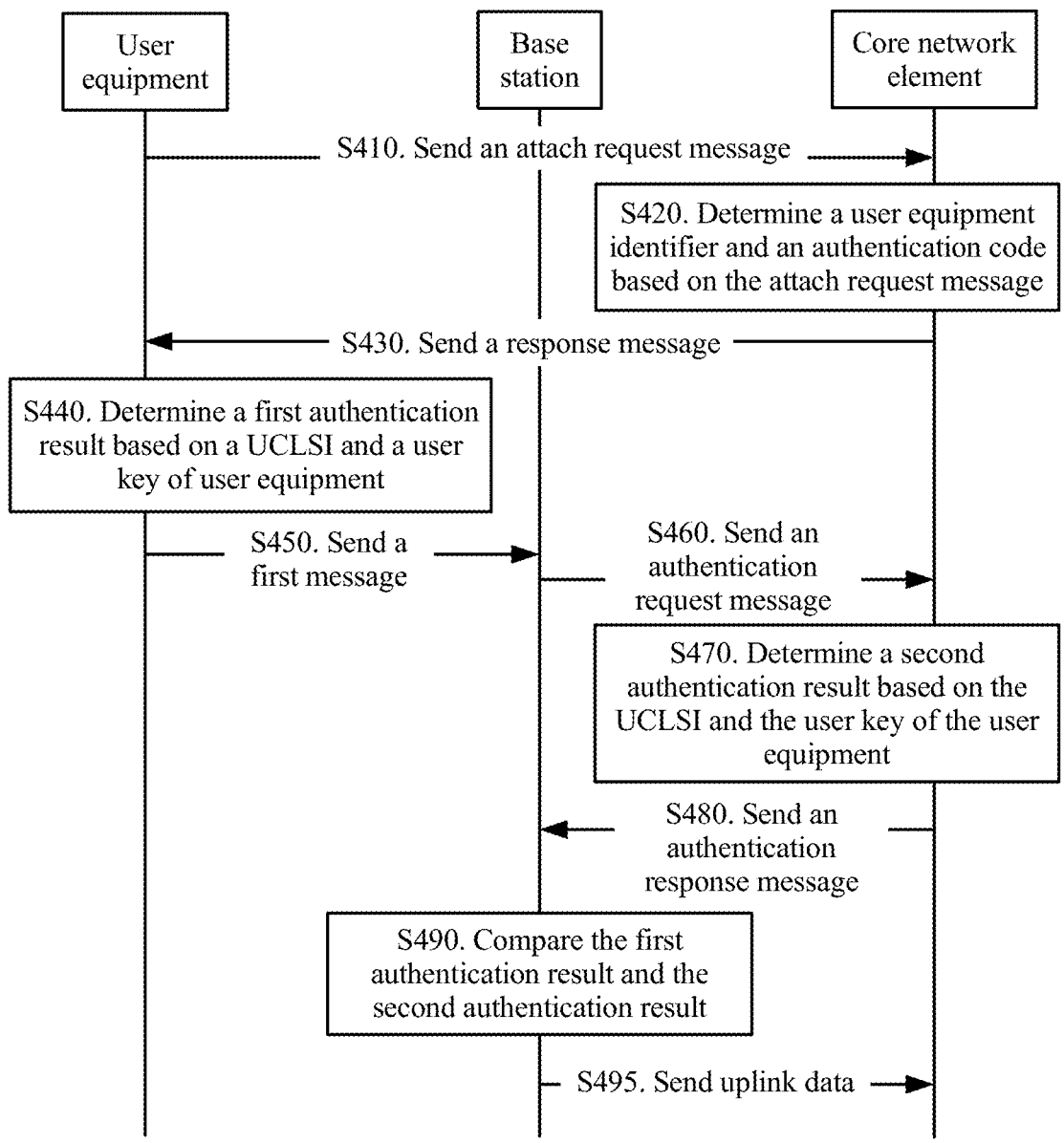
FIG. 4 is a flowchart of another authentication method according to an embodiment of the present invention.

FIG. 4 shows another authentication method according to an embodiment of the present invention. As shown in FIG. 4, the authentication method may include the following steps.

S410. User equipment sends an attach request message to a core network element.

A process of step S410 is the same as the process of S210 in FIG. 2. For brief description, details are not described herein again.

S420. The core network element determines a user plane gateway connectionless transmission service identifier UCLSI based on the attach request message.

A process of step S420 is the same as a process in which the core network element determines the UCLSI in S220 in FIG. 2, and a function of the UCLSI in step S420 is the same as that in S220. For brief description, details are not described herein again.

S430. The core network element sends a response message to the user equipment.

S410, S420, and S430 in this embodiment of the present invention are respectively corresponding to S210, S220, and S230 in FIG. 2. A difference is that in S420, the core network element does not allocate an authentication code to the user equipment that requests connectionless transmission. In S430, the response message sent by the core network element to the user equipment does not include an authentication code. In addition, processes of S410, S420, and S430 are the same as processes of S210, S220, and S230 in FIG. 2. For brief description, details are not described herein again.

S440. The user equipment determines a first authentication result based on the UCLSI and a user key of the user equipment.

In this embodiment of the present invention, the user equipment obtains an authentication result through calculation based on the UCLSI included in the response message sent by the core network element and the user key of the user equipment and by using an authentication algorithm. The authentication result is referred to as the first authentication result, and the user key of the user equipment may be referred to as a first key.

S450. The user equipment sends a first message to a base station, where the first message includes uplink data, the UCLSI, and the first authentication result.

When the user equipment receives the response message, sent by the core network element, in which attachment of the user equipment is accepted and the user equipment can perform connectionless transmission, the user equipment sends the uplink data to the base station, and adds the authentication result obtained through calculation to the uplink data.

S460. The base station sends an authentication request message to the core network element.

The authentication request message may include the UCLSI.

S470. The core network element determines a second authentication result based on the UCLSI and the user key corresponding to the user equipment.

Optionally, the core network element may calculate an authentication result based on the UCLSI and the user key corresponding to the user equipment and by using the authentication algorithm. The authentication result is the second authentication result.

S480. The core network element sends an authentication response message to the base station.

The authentication response message includes the UCLSI and the second authentication result.

S490. The base station compares the first authentication result and the second authentication result.

If the first authentication result is the same as the second authentication result, S495 is performed; or if the first authentication result is different from the second authentication result, the base station discards the received uplink data.

S495. The base station sends the uplink data to the core network element.

A process of this step is the same as the process of S295 in FIG. 2. For brief description, details are not described herein again.

Optionally, after the base station compares the first authentication result and the second authentication result, the method may further include the following: The base station sends feedback information to the user equipment, to notify the user equipment of a connectionless transmission success or failure. For example, if the first authentication result is the same as the second authentication result, the base station sends connectionless transmission success information to the user equipment; or if the first authentication result is different from the second authentication result, the base station sends connectionless transmission failure information to the user equipment.

According to the authentication method provided in this embodiment of the present invention, the base station performs security verification on the user equipment, to avoid arrival of data from unauthorized UE at the core network element, in other words, to avoid arrival of data from unauthorized UE at a core network. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

In addition, the present invention further provides an access control method for controlling connectionless transmission. A core network element or a base station controls user equipment to use a connectionless transmission service.

Figure 5:
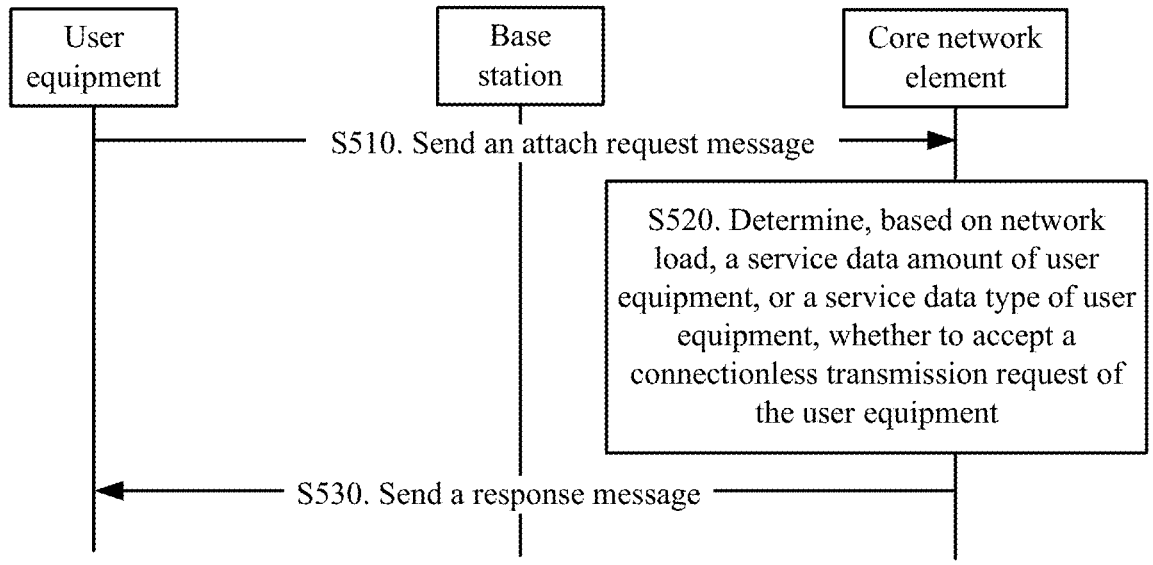
FIG. 5 is a flowchart of a connectionless transmission access control method according to an embodiment of the present invention.

The following describes in detail a solution of the present invention by using FIG. 5. As shown in FIG. 5, the method may include the following steps.

S510. A core network element receives an attach request message sent by user equipment.

The attach request message includes connectionless transmission request information, and may further include at least one of a service data amount of the user equipment or a service data type of the user equipment.

In this embodiment of the present invention, the core network element may receive an attach request message sent by at least one user equipment, and count a quantity of pieces of received connectionless transmission request information sent by the user equipment.

S520. The core network element determines, based on connectionless transmission request information, to allow the user equipment to perform connectionless transmission.

The core network element determines, based on network load, the service data amount of the user equipment, or the service data type of the user equipment, whether to accept a connectionless transmission request of the user equipment.

Optionally, that the core network element determines, based on connectionless request information, to allow the user equipment to perform connectionless transmission includes:

if a quantity of pieces of connectionless request information received by the core network element does not meet a first preset threshold within a first preset time, determining, by the core network element, to allow the user equipment to perform connectionless transmission; or if a service data amount of the user equipment does not meet a second preset threshold, determining, by the core network element, to allow the user equipment to perform connectionless transmission; or if a service type of the user equipment is a preset service type, determining, by the core network element, to allow the user equipment to perform connectionless transmission.

In other words, when the UE requests a connectionless transmission service, the core network element determines, based on a related condition (for example, the core network element determines, based on the network load, the service data amount of the UE, and the service type of the UE), whether to disallow the UE to use the connectionless transmission service.

In other words, the core network element may determine, based on the connectionless request information, not to allow the user equipment to perform connectionless transmission. For example, if a quantity of UEs that request the connectionless transmission service within a period of time exceeds a preset threshold, the core network element rejects the connectionless transmission request of the UE; or if a quantity of services of the UE exceeds a preset threshold, the core network element rejects the connectionless transmission request of the UE; or for some services, such as a latency-insensitive service, that do not need connectionless transmission, the core network element rejects the connectionless transmission request of the UE.

It should be noted that in this embodiment of the present invention, the first preset time, the first preset threshold, the second preset threshold, and the preset service type may be set based on a requirement, and are not limited in this embodiment of the present invention.

S530. The core network element sends a first response message to the user equipment.

The first response message is used to indicate that the user equipment is allowed to perform connectionless transmission.

In this embodiment of the present invention, the core network element needs to preconfigure information indicating that the user equipment uses the connectionless transmission service, or the core network element and the user equipment need to pre-negotiate a manner in which connectionless transmission may be performed.

Figure 6:
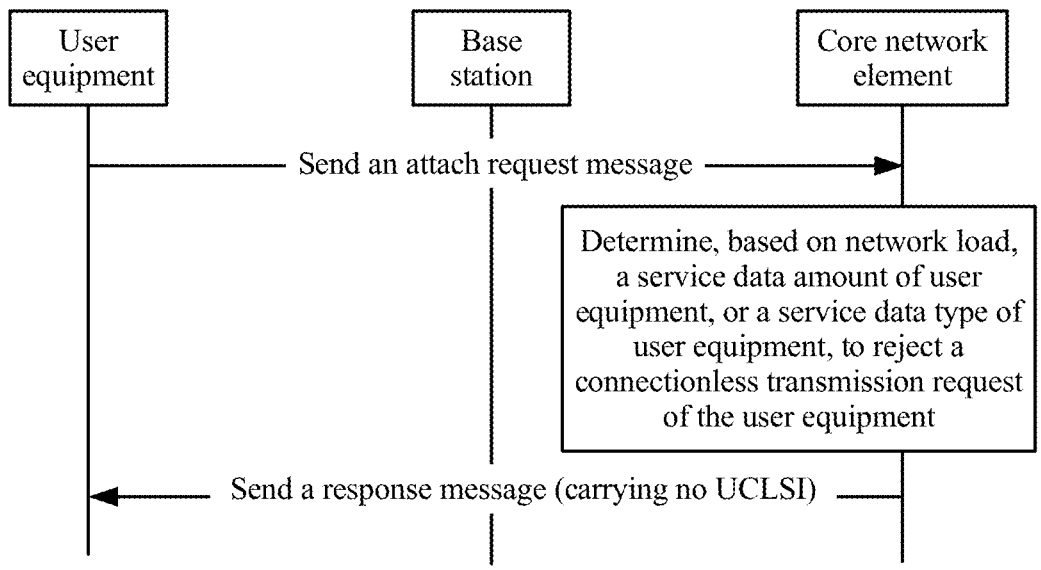
FIG. 6 is a flowchart of a connectionless transmission access control method according to an embodiment of the present invention.

In other words, the core network element needs to configure information indicating that the user equipment is allowed or not allowed to perform connectionless transmission. For example, the core network element allocates a UCLSI to the user equipment that requests connectionless transmission, to indicate that attachment of the user equipment is accepted and the user equipment may perform connectionless transmission. When an attach accept response message sent by the core network element to the user equipment does not include the UCLSI allocated to the UE, it indicates that the core network element rejects the connectionless transmission request of the user equipment. In other words, if the UE does not receive the UCLSI, it indicates that the connectionless transmission request is rejected. A schematic diagram of the process is shown in FIG. 6.

Figure 7:
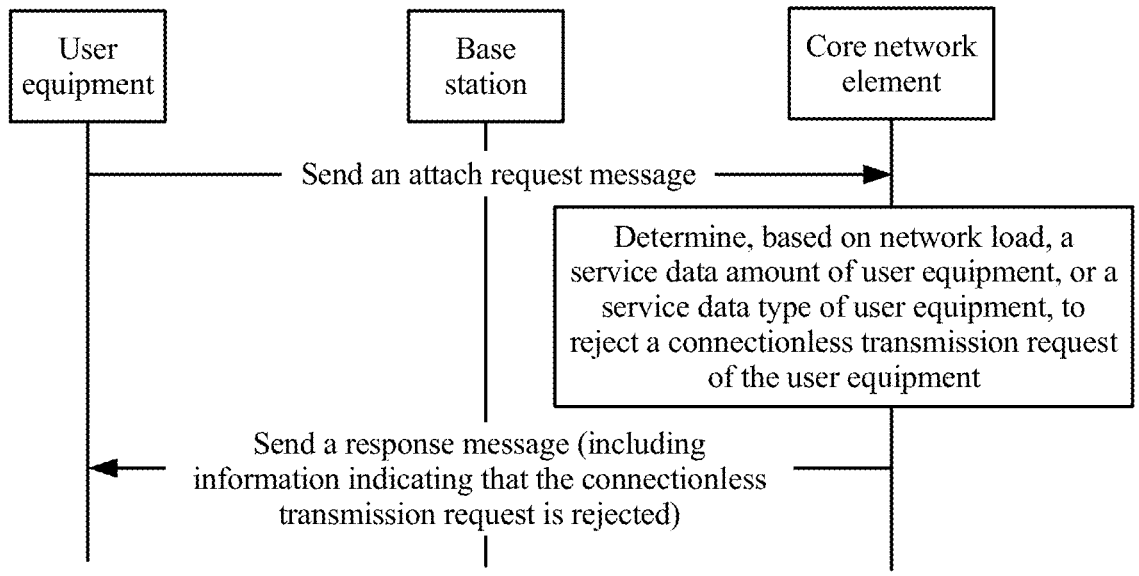
FIG. 7 is a flowchart of another connectionless transmission access control method according to an embodiment of the present invention.

Optionally, the core network element may further send a second response message to the user equipment. As shown in FIG. 7, the second response message includes information indicating that connectionless transmission is rejected.

Optionally, the user equipment sends uplink data to the base station based on the first response message sent by the core network element.

After receiving the uplink data, the base station determines, based on the network load, the service data amount, or the service type, whether to reject the connectionless transmission request of the user equipment.

Figure 8:
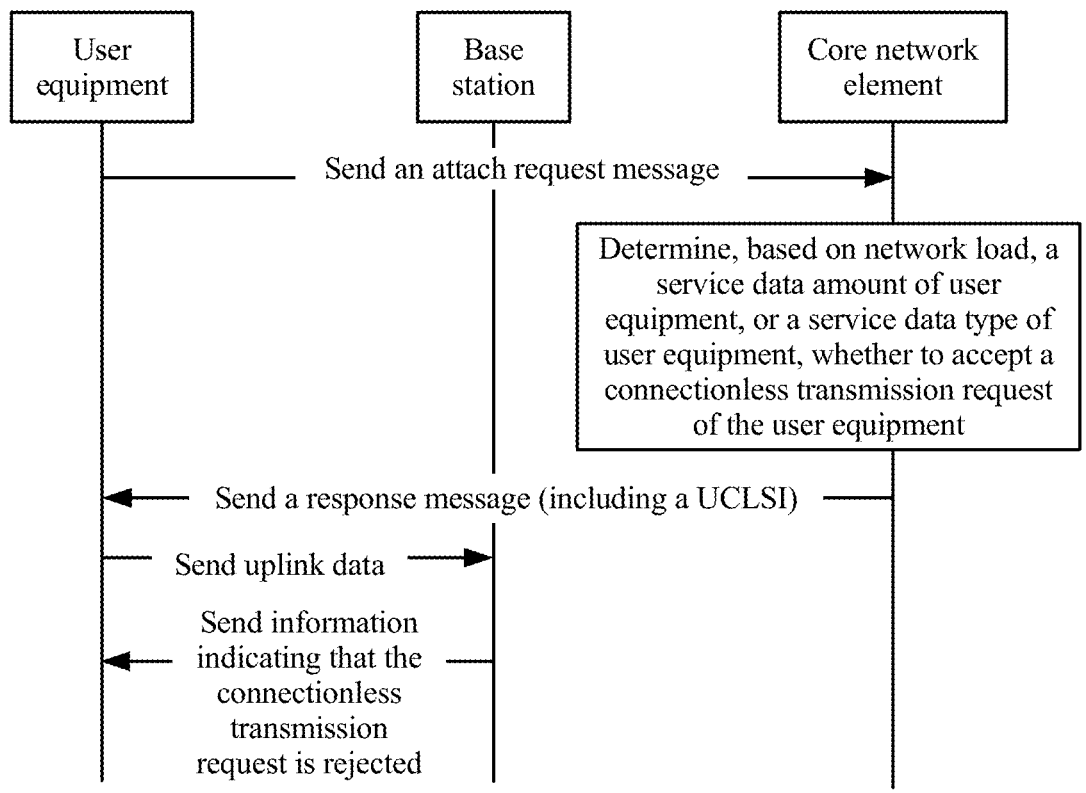
FIG. 8 is a flowchart of still another connectionless transmission access control method according to an embodiment of the present invention.

As shown in FIG. 8, after receiving the uplink data sent by the user equipment, the base station sends, to the user equipment based on the network load, information indicating that it is determined that connectionless transmission of the user equipment is rejected. The rejection information may further include a reason for rejecting connectionless transmission, a time at which the user equipment is instructed to back off for a period of time and then request connectionless transmission, or related information such as a preamble that is used to assist the user equipment in performing random access.

In this embodiment of the present invention, connectionless transmission access control performed by a network side is added, so that the network side may limit, based on a specific case, a quantity of UEs that perform connectionless transmission, to avoid impact, on a service transmitted by latency-sensitive UE, that is caused by an increase in a probability of a conflict caused by an excessive quantity of UEs that perform connectionless transmission.

It should be noted that the connectionless transmission access control method provided in FIG. 5 to FIG. 8 may be used with reference to the authentication control methods shown in FIG. 3 and FIG. 4, so that the base station verifies the user equipment to improve data security, and the network side performs connectionless transmission access control to reduce impact, on a transmission service of the UE, that is caused by an increase in a probability of a conflict caused by an excessive quantity of UEs that perform connectionless transmission.

The authentication methods in the present invention are described above in FIG. 2 to FIG. 8. A base station, user equipment, and a core network element provided in the present invention are described in detail by using FIG. 9 to FIG. 14.

Figure 9:
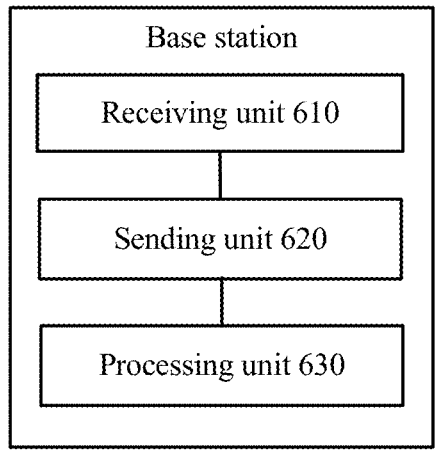
FIG. 9 is a schematic structural diagram of a base station according to an embodiment of the present invention.

FIG. 9 is a schematic structural diagram of a base station according to an embodiment of the present invention. As shown in FIG. 9, the base station includes a receiving unit 610, a sending unit 620, and a processing unit 630.

The receiving unit 610 is configured to receive a first message sent by user equipment. The first message includes uplink data, a user equipment identifier, and a first authentication result.

The sending unit 620 is configured to send an authentication request message to a core network element. The authentication request message includes the user equipment identifier, a group identifier of a group to which the user equipment belongs, or a cell identifier of a cell to which the user equipment belongs.

The receiving unit 610 is further configured to receive an authentication response message sent by the core network element. The authentication response message includes a second authentication result, and the second authentication result is an authentication result obtained by the core network element through calculation based on the authentication request message.

The processing unit 630 is configured to compare the first authentication result and the second authentication result. The sending unit sends the uplink data to the core network element if the first authentication result is the same as the second authentication result.

The base station performs security verification on the user equipment, and performs authentication by using the group identifier of the UE, the cell identifier of the cell to which the UE belongs, or the user equipment identifier, to avoid arrival of data from unauthorized UE at the core network element, in other words, to avoid arrival of data from unauthorized UE at a core network. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

Optionally, the first authentication result is an authentication result obtained by the user equipment through calculation based on an authentication code and the cell identifier; or the first authentication result is an authentication result obtained by the user equipment through calculation based on an authentication code and the group identifier; or the first authentication result is an authentication result obtained by the user equipment through calculation based on an authentication code and the user equipment identifier; or the first authentication result is an authentication result obtained by the user equipment through calculation based on a user equipment key and the user equipment identifier.

Optionally, the processing unit 630 is further configured to determine, based on network load, a service type, or a service data amount, whether to send the uplink data to the core network element. Based on security verification performed by the base station on the user equipment, connectionless transmission access control is added, to avoid impact, on a transmission service of the UE, that is caused by an increase in a probability of a conflict caused by an excessive quantity of UEs that perform connectionless transmission.

Optionally, if the processing unit 630 determines not to send the uplink data to a core network element, the sending unit sends, to the user equipment, information indicating that a connectionless transmission request is rejected, to notify the user equipment that the connectionless transmission request is rejected.

The base station provided in this embodiment of the present invention may implement S260, S280, S290, and S295 in FIG. 2. For brief description, details are not described herein again.

Figure 10:
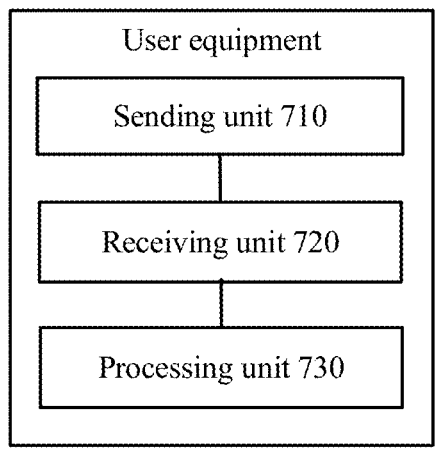
FIG. 10 is a schematic structural diagram of user equipment according to an embodiment of the present invention.

FIG. 10 is a schematic structural diagram of user equipment according to an embodiment of the present invention. As shown in FIG. 10, the user equipment includes a sending unit 710, a receiving unit 720, and a processing unit 730.

The sending unit 710 is configured to send a first request message to a core network element. The first request message is used to request a connectionless transmission service.

The receiving unit 720 is configured to receive a response message sent by the core network element. The response message includes a user equipment identifier allocated by a core network element to the user equipment, or the user equipment identifier and an authentication code allocated by a core network element to the user equipment.

The processing unit 730 is configured to determine a first authentication result based on the response message.

The sending unit 710 is further configured to send a first message to a base station. The first message includes uplink data, the user equipment identifier, and the first authentication result.

Therefore, the base station performs security verification on the user equipment based on the first authentication result, to improve security and avoid arrival of data from unauthorized UE at the core network.

Optionally, the processing unit 730 is configured to:

determine the first authentication result based on the authentication code and a cell identifier of a cell to which the user equipment belongs; or determine the first authentication result based on the authentication code and a group identifier of a group to which the user equipment belongs; or determine the first authentication result based on the authentication code and the user equipment identifier. Therefore, the base station implements group-level authentication or cell-level authentication on the user equipment, to avoid arrival of data from unauthorized UE at the core network, improve security, and save a transmission resource.

Optionally, that the processing unit 730 determines the first authentication result based on the response message includes:

determining, by the processing unit 730, the first authentication result based on the user equipment identifier and a first key, where the first key is a key of the user equipment.

Optionally, the first request message includes at least one of a service data amount of the user equipment or a service type of the user equipment, so that the core network element performs access control on a connectionless transmission request based on the service data amount of the user equipment or the service type of the user equipment, to reduce impact, on a service transmitted by latency-sensitive UE, that is caused by an increase in a probability of a conflict caused by an excessive quantity of UEs that perform connectionless transmission.

The base station provided in this embodiment of the present invention may implement S210, S240, and S250 in FIG. 2. For brief description, details are not described herein again.

Figure 11:
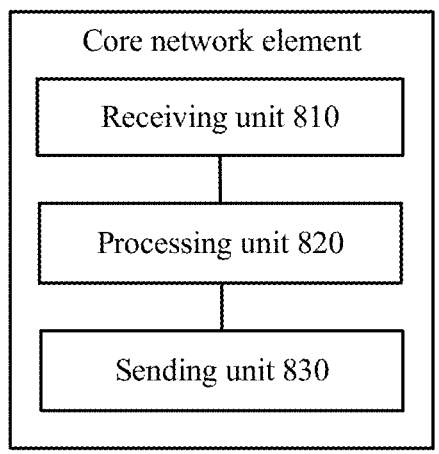
FIG. 11 is a schematic structural diagram of a core network element according to an embodiment of the present invention.

FIG. 11 is a schematic structural diagram of a core network element according to an embodiment of the present invention. As shown in FIG. 11, the core network element includes a receiving unit 810, a processing unit 820, and a sending unit 830.

The receiving unit 810 is configured to receive an authentication request message sent by a base station. The authentication request message includes a user equipment identifier allocated by a core network element to user equipment, a group identifier of a group to which user equipment belongs, or a cell identifier of a cell to which user equipment belongs.

The processing unit 820 is configured to determine a first authentication result based on the authentication request message.

The sending unit 830 is configured to send the first authentication result to the base station.

According to the core network element provided in this embodiment of the present invention, the base station implements group-level authentication or cell-level authentication on the user equipment, to avoid arrival of data from unauthorized UE at the core network, improve security, and save a transmission resource.

Optionally, the receiving unit 810 is further configured to receive a first request message sent by the user equipment. The first request message is used to request a connectionless transmission service.

The processing unit 820 is further configured to determine the user equipment identifier based on the first request message.

The sending unit 830 is further configured to send a first response message to the user equipment. The first response message includes the user equipment identifier.

Description of this process is similar to that of S210, S220, and S230 in FIG. 2. For brief description, details are not described herein again.

The core network element establishes a connectionless transmission with the user equipment, and allocates the user equipment identifier to the user equipment that requests the connectionless transmission service, so that the user equipment obtains an authentication result through calculation based on the allocated user equipment identifier, and the authentication result is used by the base station to perform security verification on the user equipment.

Optionally, the processing unit 820 is configured to: determine the first authentication result based on the user equipment identifier and a first key.

The solution provided in this embodiment of the present invention may implement S410, S420, S430, and S470 in FIG. 4. For brief description, details are not described herein again.

Optionally, in another embodiment of the present invention, the receiving unit 810 is further configured to receive a first request message sent by the user equipment. The first request message is used to request a connectionless transmission service.

The processing unit 820 is further configured to determine the user equipment identifier and an authentication code based on the first request message.

The sending unit 830 is further configured to send a second response message to the user equipment. The second response message includes the user equipment identifier and the authentication code.

Therefore, the user equipment obtains an authentication result through calculation based on the user equipment identifier and the authentication code that are allocated by the core network element to the user equipment, and the base station performs security verification on the user equipment based on the authentication result.

Optionally, that the processing unit 820 determines the first authentication result based on the authentication request message includes:

determining, by the processing unit 820, the first authentication result based on the authentication code, and the group identifier, the cell identifier, or the user equipment identifier.

The solution provided in this embodiment of the present invention may implement S310, S320, S330, and S370 in FIG. 3. For specific description, refer to S310, S320, S330, and S370 in FIG. 3. For brief description, details are not described herein again.

Optionally, the first request message includes at least one of a service data amount of the user equipment or a service type of the user equipment.

The processing unit 820 is further configured to determine, based on the service data amount of the user equipment or the service type of the user equipment, whether to accept a connectionless transmission request of the user equipment.

The specific process is the same as description processes of S296 in FIG. 2 and S510 and S520 in FIG. 5. For brief description, details are not described herein again.

The core network element implements access control on the user equipment that requests the connectionless transmission service, and a network side may limit, based on a specific case, a quantity of UEs that perform connectionless transmission, to avoid impact, on a service transmitted by latency-sensitive UE, that is caused by an increase in a probability of a conflict caused by an excessive quantity of UEs that perform connectionless transmission.

Optionally, the processing unit 820 is configured to:

if a quantity of connectionless transmission request messages received by the receiving unit 810 does not meet a first preset threshold within a first preset time, determine to accept the connectionless transmission request of the user equipment; or if the service data amount of the user equipment does not meet a second preset threshold, determine to accept the connectionless transmission request of the user equipment; or if the service type of the user equipment is a preset service type, determine to accept the connectionless transmission request of the user equipment.

It should be noted that in this embodiment of the present invention, the first preset time, the first preset threshold, the second preset threshold, and the preset service type may be set based on a requirement, and are not limited in this embodiment of the present invention.

Optionally, in an embodiment of the present invention, the user equipment identifier is used to instruct the core network element to accept the connectionless transmission request of the user equipment.

Optionally, the sending unit 830 is further configured to send a third response message to the user equipment. The third response message includes information indicating that the connectionless transmission request of the user equipment is rejected, as shown in FIG. 7.

It should be noted that in this embodiment of the present invention, the receiving unit 610 of the base station provided in FIG. 9, the receiving unit 720 of the user equipment provided in FIG. 10, and the receiving unit 810 of the core network element provided in FIG. 11 may be receivers. In this embodiment of the present invention, the sending unit 620 of the base station provided in FIG. 9, the sending unit 710 of the user equipment provided in FIG. 10, and the sending unit 830 of the core network element provided in FIG. 11 may be transmitters. In this embodiment of the present invention, the processing unit 630 of the base station provided in FIG. 9, the processing unit 730 of the user equipment provided in FIG. 10, and the processing unit 820 of the core network element provided in FIG. 11 may be processors.

Figure 12:
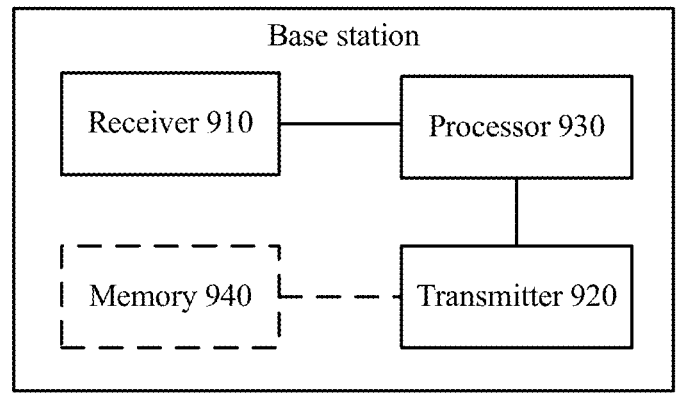
FIG. 12 is a schematic structural diagram of another base station according to an embodiment of the present invention.

FIG. 12 is a schematic structural diagram of another base station according to an embodiment of the present invention. As shown in FIG. 12, the base station may include a receiver 910, a transmitter 920, and a processor 930.

The receiver 910 is configured to receive a first message sent by user equipment. The first message includes uplink data, a user equipment identifier, and a first authentication result.

The transmitter 920 is configured to send an authentication request message to a core network element. The authentication request message includes the user equipment identifier, a group identifier of a group to which the user equipment belongs, or a cell identifier of a cell to which the user equipment belongs.

The receiver 910 is further configured to receive an authentication response message sent by the core network element. The authentication response message includes a second authentication result, and the second authentication result is an authentication result obtained by the core network element through calculation based on the authentication request message.

The processor 930 is configured to compare the first authentication result and the second authentication result. The transmitter 920 sends the uplink data to the core network element if the first authentication result is the same as the second authentication result.

The base station performs security verification on the user equipment, and performs authentication by using the group identifier of the UE, the cell identifier of the cell to which the UE belongs, or the user equipment identifier, to avoid arrival of data from unauthorized UE at the core network element, in other words, to avoid arrival of data from unauthorized UE at a core network. Therefore, security is improved. In addition, in comparison with the prior art in which a core network element performs security verification on user equipment and discards data from the user equipment if the core network element verifies that the user equipment corresponding to the received data is unauthorized user equipment, a transmission resource is saved.

The base station provided in this embodiment of the present invention may implement steps S260, S290, S295, and S297 performed by the base station in FIG. 2, S360, S390, and S395 in FIG. 3, and S460, S490, and S495 in FIG. 4. Each logical unit of the base station provided in FIG. 9 may complete, by using the base station provided in this embodiment of the present invention, steps S260, S290, S295, and S297 performed by the base station in FIG. 2, S360, S390, and S395 in FIG. 3, and S460, S490, and S495 in FIG. 4. For brief description, details are not described herein again.

Figure 13:
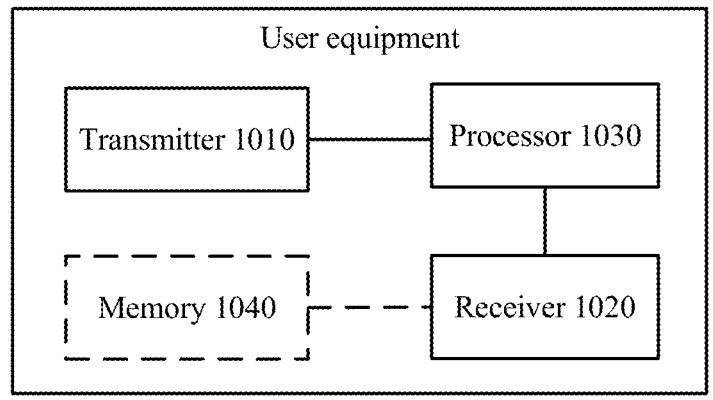
FIG. 13 is a schematic structural diagram of another user equipment according to an embodiment of the present invention.

FIG. 13 is a schematic structural diagram of another user equipment according to an embodiment of the present invention. As shown in FIG. 13, the user equipment may include a transmitter 1010, a receiver 1020, and a processor 1030.

The transmitter 1010 is configured to send a first request message to a core network element. The first request message is used to request a connectionless transmission service.

The receiver 1020 is configured to receive a response message sent by the core network element. The response message includes a user equipment identifier allocated by a core network element to the user equipment, or the user equipment identifier and an authentication code allocated by a core network element to the user equipment.

The processor 1030 is configured to determine a first authentication result based on the response message.

The transmitter 1010 is further configured to send a first message to a base station. The first message includes uplink data, the user equipment identifier, and the first authentication result.

Therefore, the base station performs security verification on the user equipment based on the first authentication result, to improve security and avoid arrival of data from unauthorized UE at the core network.

The user equipment provided in this embodiment of the present invention may implement steps S210, S240, and S250 performed by the user equipment in FIG. 2, S310, S340, and S350 in FIG. 3, and S410, S440, and S450 in FIG. 4. Each logical unit of the user equipment provided in FIG. 10 may complete, by using the user equipment provided in this embodiment of the present invention, steps S210, S240, and S250 performed by the user equipment in FIG. 2, S310, S340, and S350 in FIG. 3, and S410, S440, and S450 in FIG. 4. For brief description, details are not described herein again.

Figure 14:
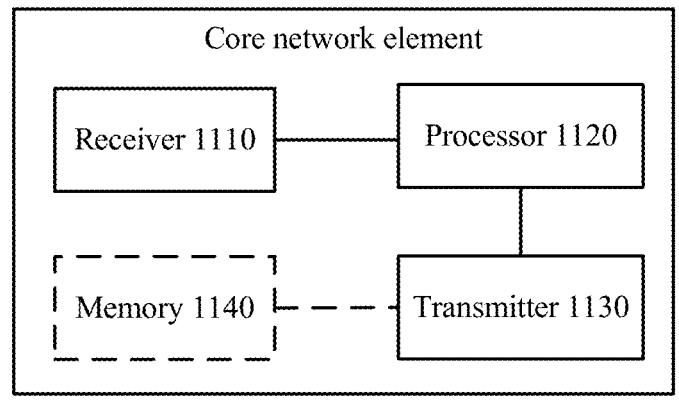
FIG. 14 is a schematic structural diagram of another core network element according to an embodiment of the present invention.

FIG. 14 is a schematic structural diagram of another core network element according to an embodiment of the present invention. As shown in FIG. 14, the core network element may include a receiver 1110, a processor 1120, and a transmitter 1130.

The receiver 1110 is configured to receive an authentication request message sent by a base station. The authentication request message includes a user equipment identifier allocated by a core network element to user equipment, a group identifier of a group to which user equipment belongs, or a cell identifier of a cell to which user equipment belongs.

The processor 1120 is configured to determine a first authentication result based on the authentication request message.

The transmitter 1130 is configured to send the first authentication result to the base station.

According to the core network element provided in this embodiment of the present invention, the base station implements group-level authentication or cell-level authentication on the user equipment, to avoid arrival of data from unauthorized UE at the core network, improve security, and save a transmission resource.

The core network element provided in this embodiment of the present invention may implement steps S220, S230, S270, S280, and S296 performed by the core network element in FIG. 2, S320, S330, S370, and S380 in FIG. 3, S420, S430, S470, and S480 in FIG. 4, and S510, S520, and S530 in FIG. 5. Each logical unit of the core network element provided in FIG. 11 may complete, by using the core network element provided in this embodiment of the present invention, steps S220, S230, S270, S280, and S296 performed by the core network element in FIG. 2, S320, S330, S370, and S380 in FIG. 3, S420, S430, S470, and S480 in FIG. 4, and S510, S520, and S530 in FIG. 5. For brief description, details are not described herein again.

It should be understood that the processor 930 in the base station provided in FIG. 12, the processor 1030 in the user equipment provided in FIG. 13, and the processor 1120 in the core network element provided in FIG. 14 may be a central processing unit (CPU), or may be another general purpose processor, a digital signal processor (DSP), an application-specific integrated circuit (ASIC), a field programmable gate array (FPGA), another programmable logic device, a discrete gate or a transistor logic device, a discrete hardware component, or the like. The general purpose processor may be a microprocessor, or the processor may be any conventional processor or the like.

In an implementation process, steps in the foregoing methods can be implemented by using a hardware integrated logic circuit in the processor 930/1030/1120, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and the processor 930/1030/1120 reads information in the memory and completes steps in the methods in combination with hardware of the processor 930/1030/1120. To avoid repetition, details are not described herein again.

In addition, the base station provided in FIG. 12 may further include a memory 940. The user equipment provided in FIG. 13 may further include a memory 1040. The core network element provided in FIG. 14 may further include a memory 1140. The memory is configured to store an instruction and data.

The memory 940/1040/1140 may include a read-only memory and a random access memory, and provide the instruction and the data for the processor 940/1040/1140. A part of the memory may further include a nonvolatile random access memory.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and beneficial effects of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A network device, comprising:
a non-transitory memory storing executable instructions; and
a processor configured to execute the executable instructions to perform operations comprising:
receiving a first message sent by a user equipment, wherein the first message comprises uplink data, a user equipment identifier, and a first authentication result, wherein the first authentication result is determined by the user equipment based on a first response message received by the user equipment from a core network element;
sending an authentication request message to the core network element, wherein the authentication request message comprises at least one of the user equipment identifier, a group identifier of a group to which the user equipment belongs, and a cell identifier of a cell to which the user equipment belongs;
receiving an authentication response message sent by the core network element, wherein the authentication response message comprises a second authentication result, and the second authentication result is an authentication result obtained by the core network element through calculation based on the authentication request message; and
comparing the first authentication result and the second authentication result, and sending the uplink data to the core network element if the first authentication result is the same as the second authentication result.

2. The network device according to claim 1, wherein the first authentication result is one of:
an authentication result obtained by the user equipment through calculation based on an authentication code and the cell identifier;
an authentication result obtained by the user equipment through calculation based on an authentication code and the group identifier; or
an authentication result obtained by the user equipment through calculation based on an authentication code and the user equipment identifier; and
an authentication result obtained by the user equipment through calculation based on a user equipment key and the user equipment identifier.

3. The network device according to claim 1, wherein the operations further comprises:
determining based on network load, a service type, or a service data amount, whether to send the uplink data to the core network element.

4. The network device according to claim 3, wherein the operations further comprises:

if the operations determines not to send the uplink data to a core network element, sending to the user equipment, information indicating that a connectionless transmission request is rejected.

5. A communication device, comprising:
a non-transitory memory storing executable instructions; and
a processor configured to execute the executable instructions to perform operations comprising:
sending a first request message to a core network element, wherein the first request message is used to request a connectionless transmission service;
receiving a response message sent by the core network element, wherein the response message comprises a user equipment identifier allocated by the core network element to the user equipment, or the user equipment identifier and an authentication code allocated by the core network element to the user equipment;
determining a first authentication result based on the response message; and
sending a first message to a base station, wherein the first message comprises uplink data, the user equipment identifier, and the first authentication result,
wherein the base station compares the first authentication result and a second authentication result, and sends the uplink data to the core network element if the first authentication result is the same as the second authentication result and wherein the second authentication result is determined by the core network element based on an authentication request message.

6. The communication device according to claim 5, wherein the determining of the operations comprises one of:
determining the first authentication result based on the authentication code and a cell identifier of a cell to which the user equipment belongs;
determining the first authentication result based on the authentication code and a group identifier of a group to which the user equipment belongs; and
determining the first authentication result based on the authentication code and the user equipment identifier.

7. The communication device according to claim 5, wherein the determining of the operations comprises:
determining the first authentication result based on the user equipment identifier and a first key, wherein the first key is a key of the user equipment.

8. The communication device according to claim 5, wherein the first request message comprises at least one of a service data amount of the user equipment or a service type of the user equipment.

9. A network device, comprising:
a non-transitory memory storing executable instructions; and
a processor configured to execute the executable instructions to perform operations comprising:
receiving an authentication request message sent by a base station, wherein the authentication request message comprises a user equipment identifier allocated by a core network element to user equipment, a group identifier of a group to which user equipment belongs, or a cell identifier of a cell to which user equipment belongs;
determining a first authentication result based on the authentication request message; and
sending the first authentication result to the base station, wherein the base station compares the first authentication result and a second authentication result, and sends the uplink data to the core network element if the first authentication result is the same as the second authentication result and wherein the second authentication result is determined by the core network element based on an authentication request message.

10. The network device according to claim 9, wherein before the receiving, the operations further comprises:
receiving a first request message sent by the user equipment, wherein the first request message is used to request a connectionless transmission service;
determining the user equipment identifier based on the first request message; and
sending a first response message to the user equipment, wherein the first response message comprises the user equipment identifier.

11. The network device according to claim 9, wherein before the receiving, the operations further comprises:
receiving a first request message sent by the user equipment, wherein the first request message is used to request a connectionless transmission service;
determining the user equipment identifier and an authentication code based on the first request message; and
sending a second response message to the user equipment, wherein the second response message comprises the user equipment identifier and the authentication code.

12. The network device according to claim 10, wherein the determining of the operations comprises:
determining, by the core network element, the first authentication result based on the user equipment identifier and a first key.

13. The network device according to claim 11, wherein the determining of the operations comprises:
determining the first authentication result based on the authentication code, and the group identifier, the cell identifier, or the user equipment identifier.

14. The network device according to claim 9, wherein the first request message comprises at least one of a service data amount of the user equipment or a service type of the user equipment, and the operations further comprises:
determining based on the service data amount of the user equipment or the service type of the user equipment, whether to accept a connectionless transmission request of the user equipment.

15. The network device according to claim 14, wherein the determining, of the operations comprises one of:
if a quantity of connectionless transmission request messages received by the core network element is less than a first preset threshold within a first preset time, determining, by the core network element, to accept the connectionless transmission request of the user equipment;
if the service data amount of the user equipment does not meet a second preset threshold, determining, by the core network element, to accept the connectionless transmission request of the user equipment; and
if the service type of the user equipment is a preset service type, determining, by the core network element, to accept the connectionless transmission request of the user equipment.

16. The network device according to claim 14, wherein the user equipment identifier is used to instruct the core network element to accept the connectionless transmission request of the user equipment.

17. The network device according to claim 14, wherein the operations further comprises:
sending a third response message to the user equipment, wherein the third response message comprises information indicating that the connectionless transmission request of the user equipment is rejected.

* * * * *